US010502346B2

(12) United States Patent
Courpet et al.

(10) Patent No.: US 10,502,346 B2
(45) Date of Patent: Dec. 10, 2019

(54) CONNECTION DEVICE OF TWO PIPES, COMPRISING A SEAL WHICH IS CONFIGURED TO LIMIT THE RISKS OF DAMAGING THE SEAL

(71) Applicant: Airbus Operations (SAS), Toulouse (FR)

(72) Inventors: Alexis Courpet, Fronton (FR); Olivier Bourbon, Aucamville (FR); Matthieu Biteau, Toulouse (FR); Jean-Marc Roques, Colomiers (FR); Christophe Buresi, Toulouse (FR); Brice Lenoir, Toulouse (FR); Philippe Villeroux, Leguevin (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 746 days.

(21) Appl. No.: 14/965,108

(22) Filed: Dec. 10, 2015

(65) Prior Publication Data
US 2016/0178096 A1 Jun. 23, 2016

(30) Foreign Application Priority Data
Dec. 19, 2014 (FR) ...................................... 14 62887

(51) Int. Cl.
*F16L 15/08* (2006.01)
*F16L 21/08* (2006.01)
(Continued)

(52) U.S. Cl.
CPC .............. *F16L 15/08* (2013.01); *F16L 21/08* (2013.01); *F16L 27/026* (2013.01); *F16L 27/1021* (2013.01); *F16L 21/00* (2013.01)

(58) Field of Classification Search
CPC . F16L 19/00; F16L 21/00; F16L 21/02; F16L 27/1017; F16L 27/113; F16L 27/026; F16L 15/08; F16L 21/08
(Continued)

(56) References Cited

U.S. PATENT DOCUMENTS 1,884,063 A * 10/1932 McWane ............... F16L 21/035
285/374
2,049,801 A * 8/1936 Gage ....................... F16L 37/54
277/626
(Continued)

FOREIGN PATENT DOCUMENTS

| FR | 462907 | 2/1914 |
|---|---|---|
| GB | 2256688 | 12/1992 |
| WO | 0063540 | 10/2000 |

OTHER PUBLICATIONS

French Search Report, dated Oct. 16, 2015.

*Primary Examiner* — Anna M Momper
*Assistant Examiner* — Williams S. Choi
(74) *Attorney, Agent, or Firm* — Green, Burns & Crain, Ltd.

(57) ABSTRACT

A connection device of a female pipe and a male pipe, with a head which is configured to be accommodated in a receptacle of the female pipe, and comprising a peripheral groove in which a seal is accommodated. The male pipe comprises at least one extension which is configured to limit the pivoting of the male pipe around an axis of rotation which is perpendicular to the longitudinal axis of the female pipe. This configuration makes it possible to limit the risks of damaging the seal.

13 Claims, 2 Drawing Sheets

(51) Int. Cl.
*F16L 21/00* (2006.01)
*F16L 27/10* (2006.01)
*F16L 27/02* (2006.01)

(58) Field of Classification Search
USPC ....... 285/233, 234, 272, 304, 374, 223, 237, 285/98, 231, 275, 278
See application file for complete search history.

(56) References Cited

U.S. PATENT DOCUMENTS

| | | | | |
|---|---|---|---|---|
| 2,432,592 A * | 12/1947 | Stecher | ............... | F16L 27/1017 285/148.19 |
| 2,455,544 A * | 12/1948 | Yonkers | ................ | F16L 21/005 285/276 |
| 2,587,475 A * | 2/1952 | Hudson | ................... | F16L 25/08 285/232 |
| 2,998,269 A * | 8/1961 | Houghton | ............... | F16L 31/00 285/112 |
| 3,695,645 A * | 10/1972 | Mommsen | ............ | F16L 37/144 24/581.1 |
| 3,781,941 A * | 1/1974 | MacFarland | .............. | A47L 9/02 15/339 |
| 4,133,563 A * | 1/1979 | Yamazaki | ........... | F16L 27/1017 285/231 |
| 5,226,682 A * | 7/1993 | Marrison | .............. | F16L 37/088 285/308 |
| 5,816,626 A * | 10/1998 | Anderson | ............... | F16L 37/22 285/318 |
| 5,984,568 A * | 11/1999 | Lohbeck | ................ | E21B 17/08 403/375 |
| 6,085,998 A * | 7/2000 | Yokoyama | .............. | B05B 1/005 239/600 |
| 6,240,957 B1 * | 6/2001 | Hattori | ................... | B60K 15/04 137/515 |
| 7,249,789 B2 * | 7/2007 | Haney | ................... | E21B 17/046 138/109 |
| 7,556,295 B2 * | 7/2009 | Holzheu | ................ | A01K 7/027 285/147.1 |
| 7,562,909 B2 * | 7/2009 | Luft | ....................... | E21B 17/04 166/241.6 |
| 8,220,840 B2 * | 7/2012 | Garraffa | ................ | B63C 11/205 128/201.27 |
| 8,931,808 B2 * | 1/2015 | Graham | ............. | G01N 30/6026 285/328 |
| 2006/0082153 A1 | 4/2006 | Haney et al. | | |
| 2016/0377210 A1 * | 12/2016 | Hatano | ................. | F16L 27/082 285/98 |

* cited by examiner

CONNECTION DEVICE OF TWO PIPES, COMPRISING A SEAL WHICH IS CONFIGURED TO LIMIT THE RISKS OF DAMAGING THE SEAL

CROSS-REFERENCES TO RELATED APPLICATIONS

This application claims the benefit of the French patent application No. 1462887 filed on Dec. 19, 2014, the entire disclosures of which are incorporated herein by way of reference.

BACKGROUND OF THE INVENTION

A connection device comprises a first pipe, also known as a female pipe, which comprises a receptacle at one of its ends, and a second pipe, also known as a male pipe, which comprises at one of its ends a head which is configured to be accommodated in the receptacle of the female pipe of the first pipe. In operation, the axes of the pipes are aligned.

For the continuation of the description, the longitudinal direction corresponds to a direction parallel to a longitudinal axis of the female pipe.

The receptacle has a diameter which is larger than the inner diameter of the remainder of the female pipe.

The head has an outer diameter which is larger than the outer diameter of the male pipe. The outer diameter of the head is very slightly smaller than the diameter of the receptacle.

The connection device comprises a groove which extends around the entire circumference of the outer surface of the head, and an annular seal which is accommodated in this groove.

In order to ensure the sealing function, the annular seal is compressed between the groove in the head of the male pipe and the wall of the receptacle of the female pipe.

According to a particular feature, the outer surface of the head has a slightly frusto-conical form upstream and/or downstream from the groove. Thus, the head has a form which is approximately spherical, with an area of contact with the receptacle at the annular seal. According to this configuration, the head can pivot relative to the receptacle, around an axis of rotation which is perpendicular to the longitudinal axis of the female pipe.

According to another particular feature, in operation this connection device permits movement according to the longitudinal direction between the pipes.

According to one application, a male pipe with a head at each of its ends is interposed between two female pipes. According to one assembly mode, the female pipes are secured and connected on a structure, whereas the male pipe is free to be displaced according to the longitudinal direction. For each connection device, the length of the head and that of the receptacle are determined such that the ducts do not work loose after assembly.

In operation, sealing problems can arise if the seal is damaged, in particular if the seal is twisted.

SUMMARY OF THE INVENTION

An objective of the present invention is to eliminate the disadvantages of the prior art.

For this purpose, the subject of the invention is a connection device of a female pipe and a male pipe, the female pipe comprising at one of its ends an upstream portion and a widened portion which forms a receptacle, the male pipe comprising at one of its ends a head which is configured to be accommodated in the receptacle of the female pipe, the head comprising a peripheral groove, a seal being positioned in the groove in the male pipe. According to the invention, the connection device is characterized in that the male pipe comprises at least one extension which is configured such as to limit the pivoting of the male pipe around an axis of rotation which is perpendicular to the longitudinal axis of the female pipe, and in that, in operation, when the axis of the male pipe is aligned with the axis of the female pipe, at least part of the extension is introduced into the upstream portion of the female pipe, and the connection device comprises play between the extension and the upstream portion of the female pipe.

This extension makes it possible to limit the pivoting of the male pipe around an axis of rotation perpendicular to the longitudinal axis of the female pipe, in particular during the introduction of the head in the receptacle. Limitation of this pivoting movement limits the risks of damaging the seal, which, if the pivoting movement is excessive, can be twisted and therefore damaged.

Preferably, the extension has a length which is the same as, or longer than, the length of the receptacle. This configuration makes it possible to optimize the guiding of the male pipe during its insertion in the female pipe, and limits the amplitude of its pivoting movements.

According to one embodiment, each extension extends from the head of the male pipe, parallel to the axis of the male pipe.

Advantageously, the play is equal to the length of the extension multiplied by $\tan(\alpha)$, the angle $\alpha$ being the maximum angle of pivoting possible between the head and the receptacle before contact.

In order to limit the losses of load, each extension comprises an inner surface in the extension of the inner surface of the male pipe.

According to one embodiment, the extension is a tube coaxial to the male pipe. This tube can comprise slots.

According to another embodiment, the connection device comprises a plurality of extensions, which each correspond to a portion of a tube. Each portion preferably extends around an angular sector of between 30° and 60°. Advantageously, each extension comprises a recess. Preferably, the extensions are regularly distributed around the circumference of the male pipe.

According to one embodiment, the head comprises an end which is configured to cooperate with an inner shoulder of the receptacle.

The subject of the invention is also a male pipe comprising at one of its ends a head which is configured to be accommodated in a receptacle of a female pipe, the head comprising on its outer surface a peripheral groove, a seal being positioned in the groove in the male pipe. The male pipe is characterized in that it comprises at least one extension which is configured such as to limit the pivoting of the male pipe, when the head of the male pipe is inserted in the receptacle of the female pipe.

BRIEF DESCRIPTION OF THE DRAWINGS

Other characteristics and advantages will become apparent from the following description of the invention, which description is provided purely by way of example, with reference to the appended drawings in which.

DETAILED DESCRIPTION OF THE PREFERRED EMBODIMENTS

Figure 1A:
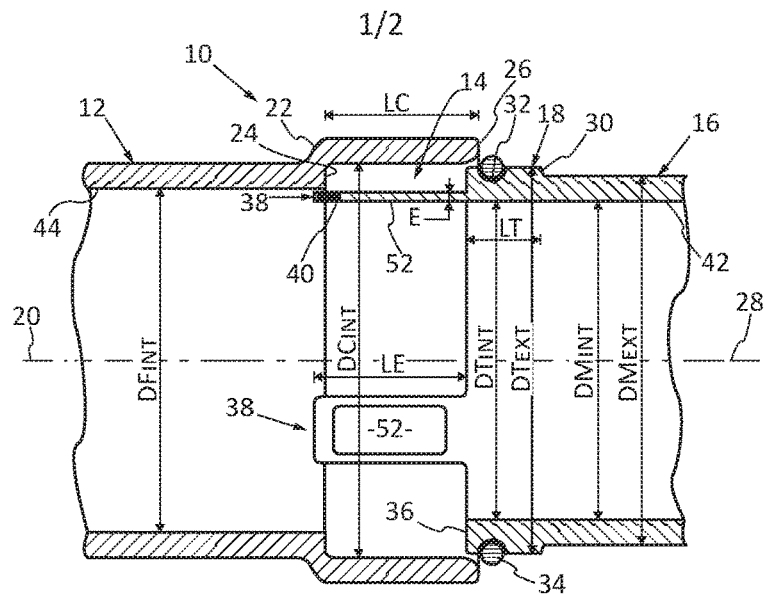
FIG. 1A is a cross-section of a connection device being assembled, which illustrates an embodiment of the invention.
Figure 1B:
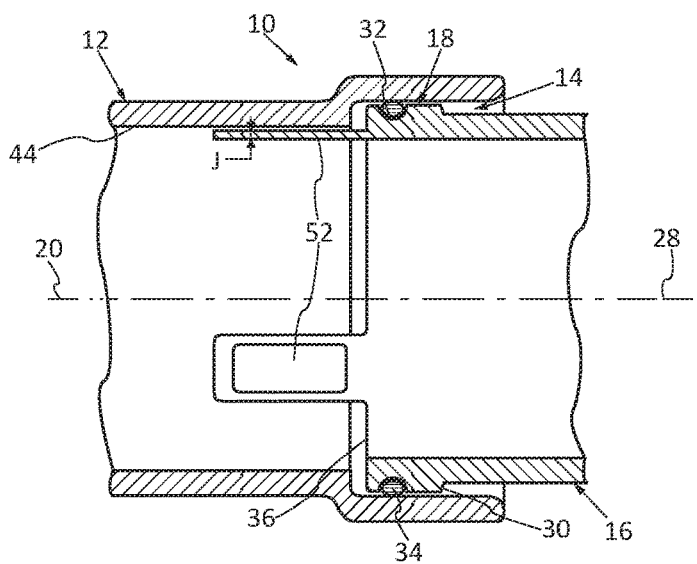
FIG. 1B is a cross-section of the connection device in FIG. 1 assembled with pipes which are aligned.
Figure 2:
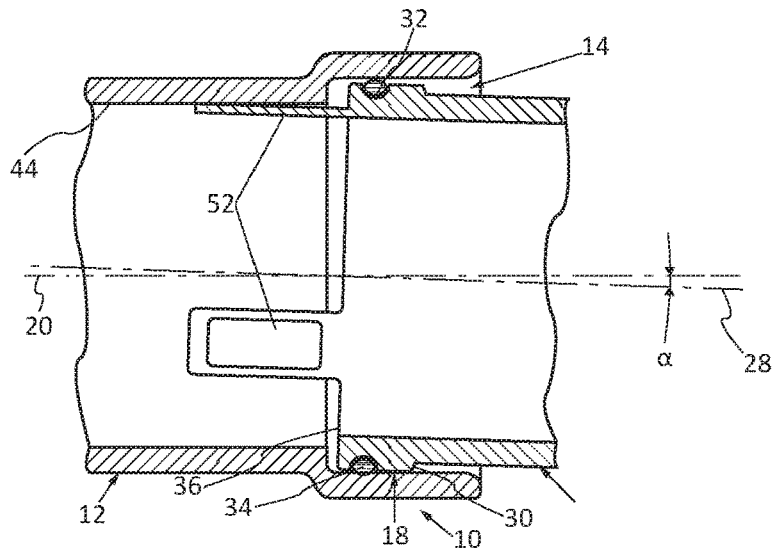
FIG. 2 is a cross-section of the connection device in FIG. 1 assembled with pipes which are not aligned.
Figure 3:
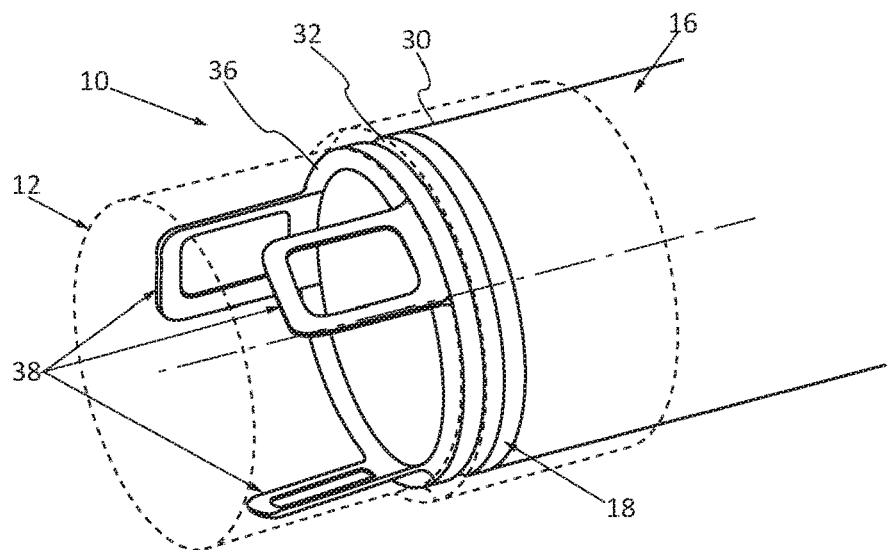
FIG. 3 is a view in perspective of the connection device in FIG. 1, the female pipe being represented in a transparent form.
Figure 4:
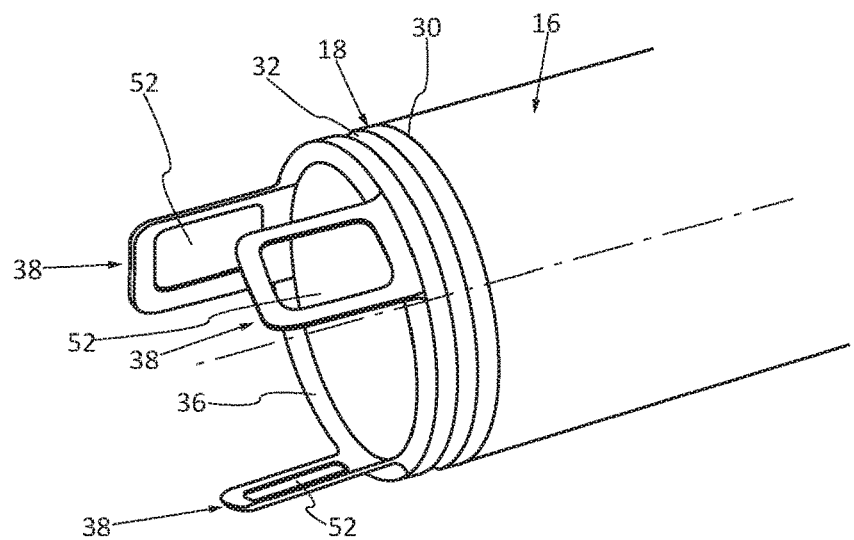
FIG. 4 is a view in perspective of the male pipe of the connection device in FIG. 1.

FIGS. 1A, 1B, 2, 3 represent a connection device 10 comprising a first pipe, also known as a female pipe 12, which comprises at one of its ends a widened portion which forms a receptacle 14, and a second pipe, also known as a male pipe 16, which comprises a head 18 at one of its ends, the head 18 being configured to be accommodated in the receptacle 14 of the female pipe 12.

The female pipe comprises a longitudinal axis with the reference 20. The receptacle 14 is coaxial to the remainder of the female pipe 12, and thus to the axis 20 of the female pipe.

The widened portion which forms the receptacle 14 is delimited at the outer surface of the female pipe 12 by an outer shoulder 22, and at the inner surface of the female pipe 12 by an inner shoulder 24.

The receptacle 14 has a diameter DCint which is larger than the inner diameter DFint of the remainder of the female pipe 12. The receptacle 14 has a length LC corresponding to the distance which separates the inner shoulder 24 and the end 26 of the female pipe 12. This length LC is determined such that the head 18 is always accommodated in the receptacle 14 when, in operation, the male and female pipes move relative to one another according to the longitudinal direction, in particular because of phenomena of expansion, or in order to take into account deflections of the tanks of an aircraft to which the pipes 12,16 may be connected.

The male pipe 16 comprises a longitudinal axis with the reference 28. The head 18 is coaxial to the remainder of the male pipe 16, and thus to the axis 28 of the male pipe.

The head 18 is delimited at the outer surface of the male pipe 16 by an outer shoulder 30.

According to one embodiment, the head 18 has an inner diameter DTint which is identical to the inner diameter DMint of the remainder of the male pipe 16, and has an outer diameter DText which is larger than the outer diameter DMext of the remainder of the male pipe 16. The diameter DText is very slightly smaller than the diameter DCint of the receptacle 14. Very slightly smaller means that the difference between the two diameters corresponds to operating play.

In its outer surface, the head 18 comprises a peripheral groove 32 which extends around the entire circumference of the head 18, on a plane perpendicular to the axis 28 of the male pipe 16. According to one embodiment, the groove 32 has a cross-section in the form of a "U."

According to one embodiment, the outer surface of the head 18 has a slightly frusto-conical form upstream and/or downstream from the groove 32. The purpose of this configuration is to limit the risk of contact between the head 18 and the receptacle 14.

The form of the head 18 permits slight pivoting, by an angle α (which can be seen in FIG. 2), of the head 18 relative to the receptacle 14, before contact between the head and the inner diameter DTint of the receptacle.

The head 18 has a thickness (half the difference between the outer diameter DText and the inner diameter DTint) which is larger than the thickness of the remainder of the male pipe 16 (half the difference between the outer diameter DMext and the inner diameter DMint) in order to accommodate the groove 32.

The connection device 10 also comprises a circular seal 34 which is accommodated in the groove 32. According to one embodiment, the seal 34 is an annular seal. The seal 34 has dimensions such as to be compressed between the groove in the male pipe 16 and the female pipe 12. According to this configuration, the head 18 has an approximately spherical form with an area of contact with the receptacle 14 at the seal 34. Thus, the head 18 can pivot relative to the receptacle 14, around an axis of rotation perpendicular to the longitudinal axis 20 of the female pipe 12.

The head 18 has a length LT which extends from the outer shoulder 30 as far as the end 36 of the male pipe. The length LT of the head is determined such as to accommodate the groove 32. The length LT is distinctly smaller than the length LC of the receptacle 14. The length LT is as small as possible in order to reduce the weight of the male pipe 16.

According to one embodiment, the end 36 of the head 18 is a flat ring which extends on a plane perpendicular to the axis 28 of the male pipe.

Preferably, the end 26 of the female pipe has a form which assists the insertion of the head 18 in the receptacle 14.

According to a characteristic of the invention, the male pipe 16 comprises at least one extension 38 which extends from the head 18 of the male pipe 16, parallel to the axis 28 of the male pipe 16. In operation, at least part of the extension is introduced into the upstream portion of the female pipe with a diameter DFint.

This extension 38 makes it possible to limit the pivoting of the male pipe around an axis of rotation perpendicular to the axis 20 of the female pipe, in particular during the introduction of the head 18 into the receptacle 14. Limitation of this pivoting movement limits the risks of damaging the seal 34 which, if the pivoting movement is excessive, can be twisted and therefore damaged. This extension 38 also makes it possible to avoid contact between the head 18 and the receptacle 14.

Advantageously, in order to ensure optimum guiding of the head 18 when it is introduced into the receptacle 14, each extension 38 has a length LE which is longer than, or equal to, the length LC of the receptacle 14.

In order to not to increase the weight of the male pipe excessively, the length LE of the extension 38 is between the length LC of the receptacle and this same length LC plus 5 mm.

Each extension 38 has a thickness E which is sufficient to limit its deformations, but is as small as possible in order to not to increase excessively the weight of the male pipe.

Advantageously, each extension 38 comprises an inner surface 40 in the extension of the inner surface 42 of the male pipe, in order to limit the losses of load. In operation, when the axis 28 of the male pipe is aligned with the axis 20 of the female pipe, the connection pipe comprises play J between each extension and the upstream portion of the female pipe 12, in order to facilitate the insertion of the male pipe 16 in the female pipe 12.

According to another characteristic, each extension 38 is configured such that the pivoting movement of the male pipe around an axis of rotation perpendicular to the axis 20 of the female pipe does not exceed an angle α of approximately 2°, the angle α being the maximum angle of pivoting possible between the head 18 and the receptacle 14 before contact between the walls and/or extensions of the two pipes.

According to one embodiment, when the axis 28 of the male pipe is aligned with the axis 20 of the female pipe, the play J is equal to the length of the extension multiplied by the tangent of 2°, i.e., J=LE·tan(2°).

Figure 5:
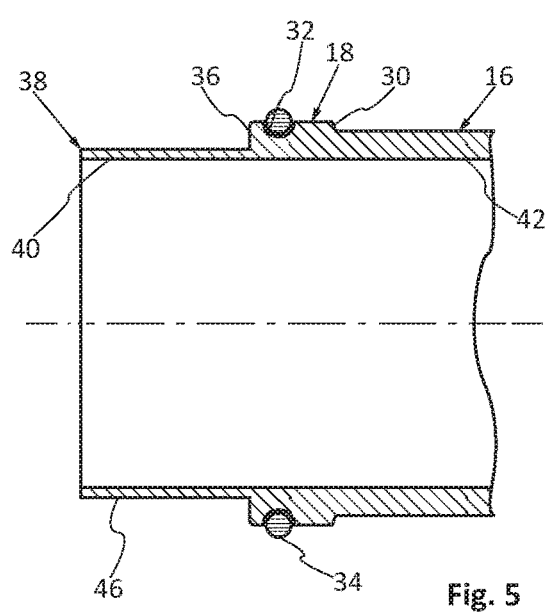
FIG. 5 is a view in cross-section of a male pipe of a connection device which illustrates another embodiment of the invention.

According to a first embodiment illustrated in FIG. 5, the male pipe comprises a single extension in the form of a tube 46 coaxial to the male pipe. This tube 46 has an inner diameter which is equal to the inner diameter of the male pipe 16, and a thickness E such that play J continues to exist (with J equal to the length of the tube times tan(α)) between the tube and the inner surface of the female pipe, when the axes 20 and 28 of the female pipe and the male pipe are combined.

Figure 6:
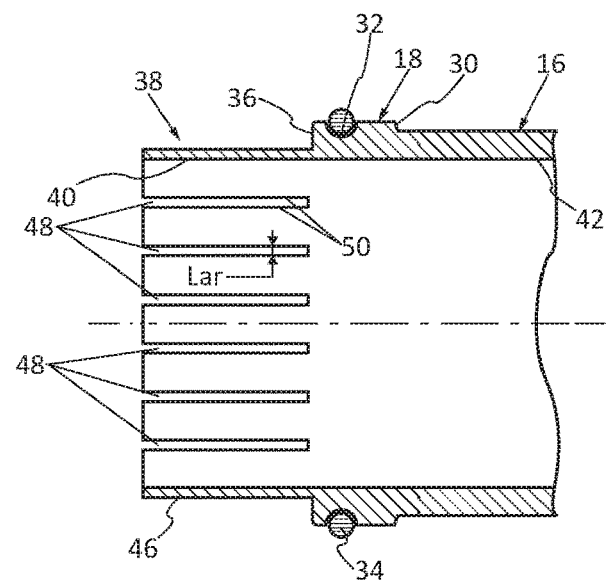
FIG. 6 is a view in cross-section of a male pipe of a connection device which illustrates another embodiment of the invention.

According to another embodiment illustrated in FIG. 6, the tube 46 comprises slots 48 which separate the tube 46 into a plurality of extensions 38. These slots 48 make it possible to reduce the weight of the male pipe in comparison with the embodiment in FIG. 5.

According to one configuration, the slots 48 comprise two edges 50 parallel to the longitudinal direction, and which have a width Lar. Preferably, the slots 48 extend from the end of the pipe 46 as far as the end 36 of the male pipe 16.

The slots 48 may all have the same length or do not all have the same length. The number and width of the slots can vary from one embodiment to another.

According to another embodiment illustrated in FIGS. 1A, 1B, 2 to 4, the male pipe comprises three extensions 38. Each extension 38 corresponds to a portion of a tube, and extends around an angular sector of approximately 30° to 60°. Preferably, the extensions are regularly distributed around the circumference of the male pipe 16.

It will be appreciated that the invention is not limited to this number of extensions. Irrespective of the embodiment, the male pipe comprises at least one extension, the number, forms and/or dimensions of the extension(s) 38 being determined such as to limit the pivoting of the male pipe around an axis of rotation perpendicular to the axis 20 of the female pipe.

Advantageously, each extension 38 comprises a recess 52 in order to reduce the weight of the male pipe. According to one embodiment, the recess 52 has a closed, square or rectangular contour with rounded angles. Each recess 52 has dimensions such as to retain only a strip of material on its periphery with a width of between 5 and 20 mm.

According to another particular feature, the end 36 of the head 18 is configured to cooperate with the inner shoulder 24 of the receptacle 14, such as to limit the movement according to the longitudinal direction of the head 18.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection device comprising:
   a female pipe comprising at one of its ends an upstream portion and a widened portion which forms a receptacle, the receptacle having a first length and a first diameter which is larger than an inner diameter of the upstream portion of the female pipe,
   a male pipe comprising at one of its ends an upstream portion and a head which is configured to be accommodated in the receptacle of the female pipe,
   the head having a second diameter which is larger than an outer diameter of the upstream portion of the male pipe and very slightly smaller than the first diameter of the receptacle,
   the head having a form permitting slight pivoting of the head relative to the receptacle,
   said head comprising a peripheral groove,
   a seal being positioned in the peripheral groove in the male pipe,
   said male pipe comprising at least one extension configured to limit a pivoting movement of the male pipe relative to the female pipe around an axis of rotation which is perpendicular to a longitudinal axis of the female pipe, and
   in operation, when a longitudinal axis of the male pipe is aligned with the longitudinal axis of the female pipe and the second diameter of the head is positioned within the receptacle, at least part of the at least one extension is introduced into the upstream portion of the female pipe, the at least one extension having an outer diameter less than the second diameter of the head in order to be introduced into the upstream portion of the female pipe, and
   the connection device comprising play between the at least one extension and the upstream portion of the female pipe such that the pivoting movement of the male pipe relative to the female pipe does not exceed an angle α, the angle α being the maximum angle of the pivoting movement before contact between the male and female pipes,
   the at least one extension having a length which is at least as long as the first length of the receptacle.

2. The connection device according to claim 1, wherein the angle α of the pivoting movement does not exceed approximatively 2°.

3. The connection device according to claim 1, wherein each at least one extension extends from the head of the male pipe, parallel to the longitudinal axis of the head of the male pipe.

4. The connection device according to claim 1, wherein the play is equal to the length of the at least one extension multiplied by tan(a).

5. The connection device according to claim 1, wherein each of the at least one extension comprises an inner surface in an extension of an inner surface of the male pipe.

6. The connection device according to claim 1, wherein the extension of the inner surface of the male pipe is a tube coaxial with the male pipe.

7. The connection device according to claim 6, wherein the tube comprises slots.

8. The connection device according to claim 1, further comprising a plurality of extensions, each extension corresponds to a portion of a tube.

9. The connection device according to claim 8, wherein each portion of the tube extends around an angular sector of between 30° and 60°.

10. The connection device according to claim 8, wherein the plurality of extensions are regularly distributed around a circumference of the male pipe.

11. The connection device according to claim 8, wherein each extension comprises a face formed by opposing inner and outer surfaces and a recess forming a through-hole in the face.

12. The connection device according to claim 11 wherein the through-hole is centered on the face of the at least one extension.

13. The connection device according to claim 1, wherein the head comprises an end which is configured to cooperate with an inner shoulder of the receptacle.

\* \* \* \* \*